Oct. 17, 1967 D. R. FALKENBERG ET AL 3,347,211
THERAPEUTIC TREATMENT OF AQUATIC ANIMAL LIFE IN THEIR HABITAT
Original Filed April 10, 1963 2 Sheets-Sheet 2
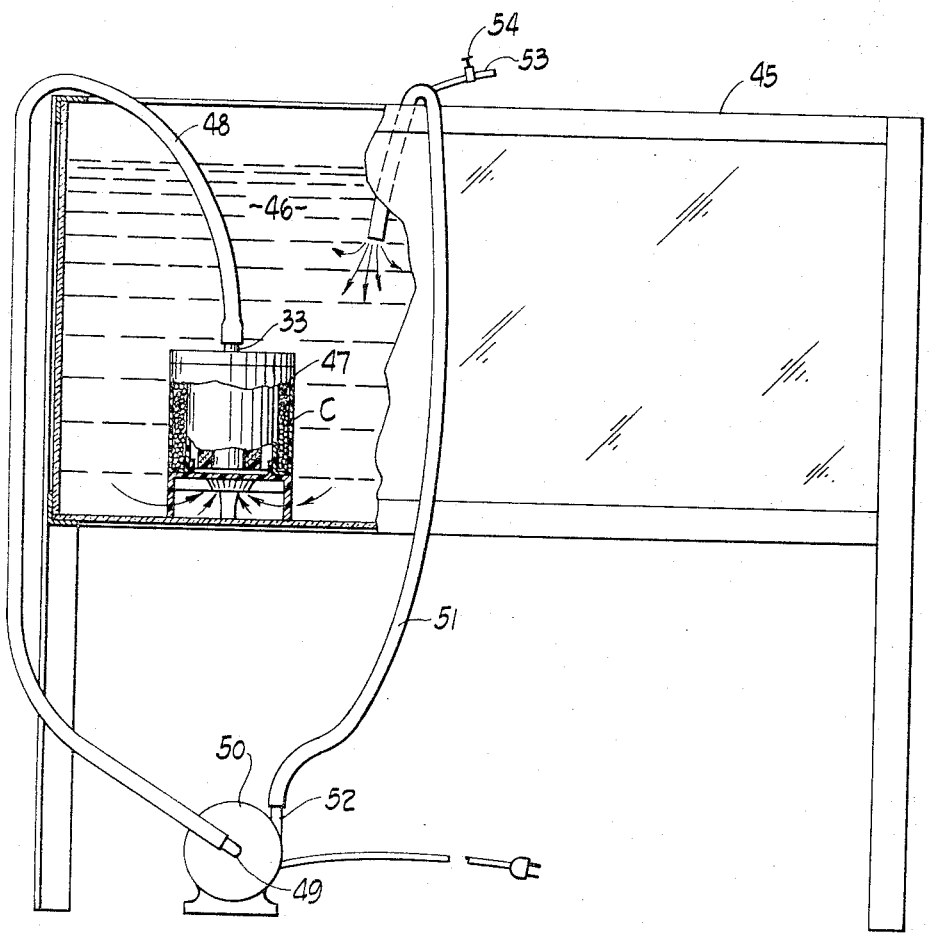
FIG_5
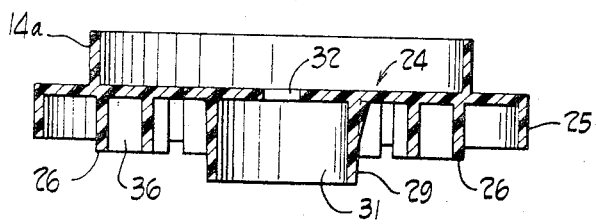
FIG_6
INVENTORS.
EDWARD L. SHARPE
DOUGLASS R. FALKENBERG
Kramer & Stenger
ATTORNEYS United States Patent Office 3,347,211
Patented Oct. 17, 1967

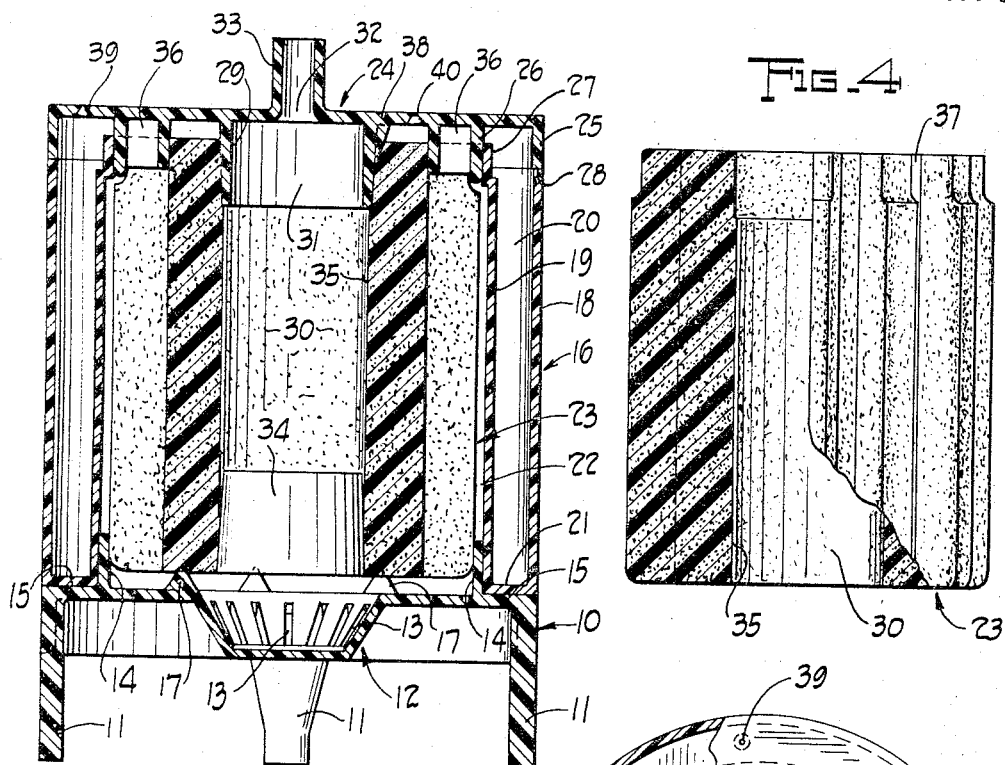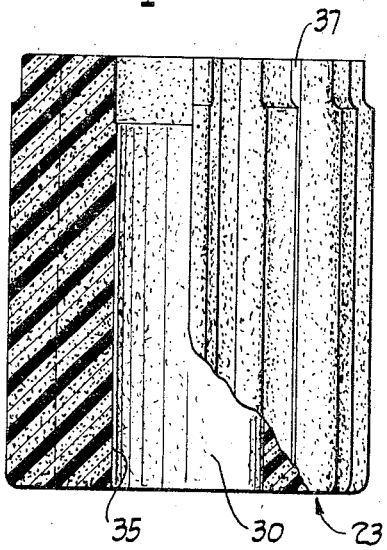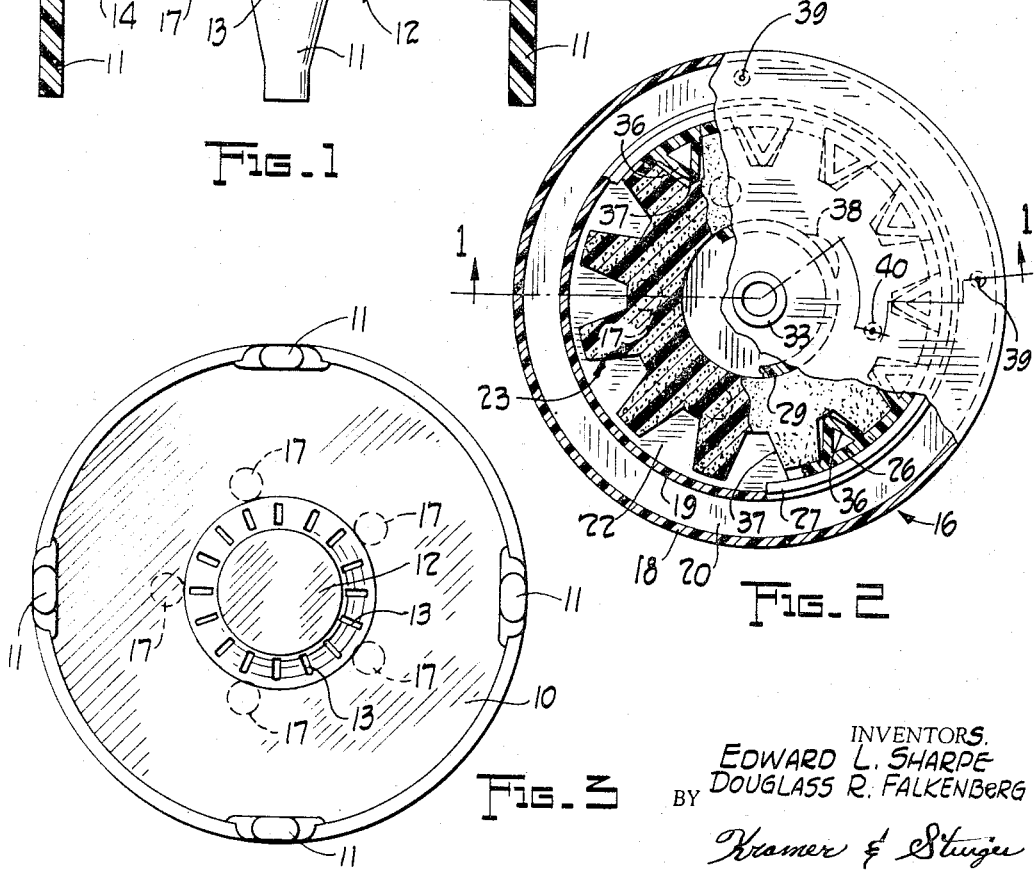

3,347,211
THERAPEUTIC TREATMENT OF AQUATIC
ANIMAL LIFE IN THEIR HABITAT
Douglass R. Falkenberg, 20997 Westlake Road, Rocky River, Ohio 44116, and Edward L. Sharpe, Elyria, Ohio; said Sharpe assignor to said Falkenberg
Original application Apr. 10, 1963, Ser. No. 272,002, now Patent No. 3,292,792, dated Dec. 20, 1966. Divided and this application Sept. 6, 1966, Ser. No. 577,339
6 Claims. (Cl. 119—5)

Douglass R. Falkenberg and Edward L. Sharpe are joint inventors of the invention described in this application which is a division of their co-pending application Ser. No. 272,002, filed Apr. 10, 1963, now Patent No. 3,292,792.

This invention relates, as indicated, to a method for therapeutically treating aquatic animal life.

The invention is especially useful for conditioning aqueous medium in aquariums for the keeping of aquatic life such as fish, lobsters and other marine life, either domestically or commercially.

Marine aquarists have long recognized the problem of build up of nitrogen compounds. In the aquarium, nitrates are the oxidation of products of various organic materials among which are uneaten food, fish, excrement and urine. and various microorganisms. Even well-managed aquaria usually contain three to six times the normal amount of nitrogen found, for example, in sea water, and old established aquaria are frequently found containing up to ten times the normal amount of nitrates. This is an unnatural condition imposed upon marine fishes, for in their native habitat, natural nitrogen absorbing materials keep dissolved nitrates down to much lower levels. Over long periods of time, excessive nitrate content affects marine fishes adversely by reducing their resistance to diseases, thereby decreasing their life spans. Normally, ordinary marine filter materials such as charcoal, chalk, etc., do not remove the dissolved nitrates.

It has been found quite unexpectedly that the filter element disclosed in Patents 2,539,767 and 2,539,768, when used as a filter medium reduces the nitrates in an aqueous medium containing the aquatic life to a level approaching the natural habitat of the marine life. Also, that fish exposed to the filtrate from this filter medium are therapeutically treated and derive beneficial effects. For example, fish diseased with ich, talrot, fungus and light cases of velvet have been cured. This filter medium also cleans the aqueous medium to where it literally sparkles.

Briefly stated the invention is in a method for therapeutically treating aquatic animal life. Accordingly, aqueous medium is passed through a filter medium comprising a porous melamine-aldehyde resin bonded flocculated cellulose fiber filter medium. The aquatic animal life is then exposed in, or contacted with the filtrate or filtered aqueous medium.

The method of therapeutically treating aquatic animal life will be better understood by having reference to the annexed drawing wherein:

FIG. 1 is a cross-sectional view of a filter cartridge used in the present invention showing also in cross section the porous or foraminous physically solid filter medium;

FIG. 2 is a partially cut away top elevation of the filter shown in FIG. 1, successive layers having been partially cut away to better show details of the filter;

FIG. 3 is a bottom elevation of the device shown in FIG. 1 showing the means for passing aqueous medium through the bottom of the filter;

FIG. 4 is a partially cut away elevation of a foraminous physically solid filter medium of the type which is particularly useful in the filter cartridges;

FIG. 5 shows a home-type aquarium using the filter medium and cartridge of this invention in combination with a centrifugal pump and aspirator for aeration; and FIG. 6 is a cross-sectional view of a modified cover which is useful for stacking several filters in series.

Referring more particularly to FIGS. 1–3, there is provided a base 10 which is preferably circular and formed from an extrudible plastic material such as polyethylene. The base 10 is provided with a plurality of legs 11 which serve in spacing the cartridge from the bottom of an aquarium such as shown in FIG. 5, and aid in the flow of the aqueous medium to the opening through the base 10.

While any convenient opening in the base 10 may be provided, it is preferable that the opening be in the form of a frusto-conical section coaxially disposed and generally indicated at 12. A plurality of slits 13 are provided in the frusto-conical section 12 for allowing aqueous medium to flow into the filter cartridge. Such a structure reduces the danger of drawing smaller species of aquatic life into the interior of the cartridge.

The base 10 is provided with an upstanding circular rim 14 which defines a peripheral annular shoulder 15 against which the double-walled hollow body 16 is conveniently seated. The circular rim 14 is sized and positioned to frictionally engage and retain double-walled body 16.

The base 10 is also conveniently provided with a plurality of supporting points 17 which serve to support the foraminous filter medium in spaced relation to the base 10 thereby aiding the flow of fluid for distribution to the filtering surfaces as will be hereinafter described.

The base 10 as indicated above can be cast as a unit in an extrusion-type plastic molding machine using polyethylene, or any other suitable thermoplastic, water insoluble resinous material.

The cartridge body 16, as indicated above, is desirably a double-walled body having an outer wall 18 and an inner wall 19 in concentric spaced relation to each other and defining an annular chamber 20. Cylindrical walls 18 and 19 are desirably maintained in spaced relation by an integrally cast annular ring 21 at one extremity and preferably adapted for coaction with the base 10 to firmly seat against the shoulder 15 to provide a rigid support for the body 16.

The annular chamber 20 provides a space into which a liquid, solid or a combination of the two may be disposed for decorative purpose, and also serving as a ballast to hold the cartridge-filter medium assembly in submerged substantially stationary position in an aquarium. For example, it has been found decorative to fill the annular chamber 20 with a colored gravel of the same or contrasting color of the gravel normally used to provide a decorative base in a home aquarium.

The inner cylinder wall 19 defines an inner chamber 22 which is adapted to receive the foraminous filter medium generally indicated at 23. As indicated above, the inner cylindrical wall 19 is formed on a diameter which is adapted to coact with upstanding circular end 14 for frictional engagement of the body 16 with the base 10.

The cartridge is completed by a cover generally indicated at 24. The cover 24 is provided with an outer circular depending skirt 25 which is adapted to coact with the outer wall 18 and an inner circular rim 26 concentric therewith and of a smaller diameter than depending rim or skirt 25. Depending circular rim 26 is adapted to frictionally coact with friction ring 27 which is integrally cast with inner cylindrical wall 19. Circular rim 26 also coacts with friction retaining ring 27 to isolate annular chamber 20 from the filter medium receiving chamber 22. In the assembled condition, the outer depending skirt 25 abuts against the upper edge 28 of outer cylindrical wall 18. Provision of a more complex sealing means for outer chamber 20 is unnecessary. However, because inner chamber 22 with the exception of the fluid inlet generally indicated at 12 is desirably fluid-tight, depending circular rim 26 overlaps friction retaining ring 27 for a distance sufficient to assure a substantially fluid-tight seal.

Cover 24 is also provided with a still smaller diameter circular depending skirt 29 which is adapted to coact with recess 30 in the foraminous filter medium 23, such coaction being in fluid-tight relationship. Depending circular skirt 29 defines a cup 31 which collects fluid which has passed through the foraminous filtering medium 23 and conducts it to opening 32 in cover 24 which is conveniently provided with a nipple 33 to which a hose, for example a plastic tube, may be secured as shown in FIG. 5.

Recess 30 in the foraminous filter 23 may be provided most conveniently by inserting a plug 34 in one end of the bore 35 which is axailly formed in the foraminous filter 23. An ordinary bottle cork provides a suitable plug 34. Alternatively, the foraminous filter member 23 may be formed so that one end is closed so that aqueous fluid is forced to pass through the pores in the filter medium.

The filter medium 23 as described in the aforementioned patents is principally composed of wool fibers employing up to 40% by weight of other fibers such as esbarto, yucca, asbestos and the like. The fibrous material is first beaten and added to a liquid dispersion of a resin such as melamine formaldehyde, in a solvent, or any suitable liquid suspending medium. The resulting mixture is brought to proper consistency and then fed to a felting tank where it is kept thoroughly agitated in order to maintain a uniform consitsency throughout the entire mass.

In accordance with the disclosure of Patent 2,539,767, there is employed a perforated former or die which is immersed in the liquid suspension of fibers within the felting tank, and the resin-impregnated fibers are caused to be accreted upon the formers by the application of a controlled degree of suction imposed upon the interior of such formers. By controlling the degree of vacuum and the length of time over which it is applied, in conjunction with the proper control of the characteristics of the fibers, a filter medium is produced of the depth or thickness in graded porosity that is desired. The proportion of resin in the fibrous body is also a factor in producing a filter element of the desired degree of strength to withstand the pressure drive to which it may be subjected in use. A specific composition that has been found particularly suitable is one comprising 85% wool fibers and 15% esbarto fibers, and having 35% resin content by weight of the finished filter element.

The filter elements may be used in the cylindrical form having a slightly tapered bore axially disposed therein, such bore being the result of forming the fiber medium upon a tapered porous former or mandrel. It is preferred in the filtering of aquarium media that the filter be fluted as is best shown in FIGS. 2 and 4 in order to increase the surface exposed to the aqueous medium to be filtered and also to present a variety of porosities to the medium being filtered.

In order to stabilize the filter medium shaped with longitudinal flutes or grooves and prevent undesirable rotation of the filter medium and possible breaking of desired fluid-tight seals, there have been provided and integrally cast with cover 24, a plurality of circumferentially disposed stabilizing fingers or projections 36 which coact with the grooves 37 longitudinally cut in the body of the filter medium 23. The supporting points 17 on the base 10 act to maintain projections 36 in interlocking engagement with the grooves 37.

Also as shown in FIG. 1 there are conveniently provided one or more detents 38 (diverging toward the exterior) on the outer marginal surface of cup 31 for the purpose of aiding and frictionally seating and retaining filter member 23 in fluid-tight sealing engagement.

In order to permit air to escape from the cartridge when the assembly is initially submerged in the aquarium as shown in FIG. 5, a plurality of spaced air release vents 39 may be provided to exhaust air from the chamber 20 and one or more air release vents 40 may be provided to release air from the inner chamber 22.

FIG. 5 shows a conventional home-type aquarium fitted with the filter and filter cartridge used in one system for conditioning the water in the aquarium. Accordingly, there is shown an aquarium 45 containing an aqueous medium generally indicated at 46. The aqueous medium may be either fresh water or saline, depending upon the nature of the aquatic life contained therein. A filter cartridge of the type shown in FIG. 1 is generally indicated at C, that portion corresponding to chamber 20 being filled with a gravel ballast 47 to aid in maintaining the cartridge on the bottom of the aquarium 45.

An outlet tube 48 is secured to the cartridge C by forcing the tubing 48 over the nipple 33. The tubing 48 is connected to the inlet 39 of a centrifical pump 50. A return line 51 is connected to an outlet 52 and returns the filtered aqueous medium to the aquarium 45. As indicated above, the return line may be provided with a small diameter air bleed-in tube 53 with a clamp 54 for regulating the amount of air introduced into the line.

The apparatus shown in FIG. 5 provides a very convenient means for adequately conditioning the water for the maintenance of the marine life in a domestic and commercial aquarium.

A plurality of cartridges of the type shown in the annexed drawing may be assembled in series so that water from an aquarium may be sequentially submitted to a variety of treatments for the purpose of conditioning the water for the benefit of the aquatic life. Thus, for example, by modifying the cover 24 to provide an upstanding circular rim corresponding to circular rim 14, the cover 24 may be readily converted to a base with respect to another body member corresponding to body 16 supra imposed thereon.

As previously indicated, it is found most unexpectedly that the melamine formaldehyde resin binder used in forming the resin bonded fibrous filter media as described in Patent 2,539,768 coacts especially with fresh water and saline media to reduce the quantity of nitrogen-containing contaminants. It has been found that the melamine formaldehyde resin as deposited from a 50% solid solution in butyl alcohol is particularly effective as an adsorbent for nitrogenous matter.

In an ordinary 15-gallon fresh water fish tank it has been found that with a normal stock of tropical fish the filter media are effective to maintain the aquarium medium brilliantly clear and at a bacteria count which is less then the bacterial count which is less than the bacteria count in municipally treated drinking water for periods of time ranging upwards of two months. The replacement filter media are relatively inexpensive and because of the simplified construction of the cartridge are readily replaced.

Using a centrifical pump such as shown in FIG. 5 and a plastic or polyethylene return pipe, the pipe may be provided with means for admitting air into the return lines so that oxygen is continuously admitted to the returning stream to maintain the oxygen level in the water at the proper point to sustain aquatic life.

Thus, there has been provided a new and novel method for therapeutically treating aquatic life which was discovered quite unexpectedly when a filter medium as described in the above-mentioned patents was used to filter aqueous medium containing aquatic life.

What is claimed is:

1. A method for therapeutically treating aquatic animal life in an aqueous habitat medium comprising the steps of passing the aqueous medium through a porous melamine-aldehyde resin containing filter medium and contacting the aquatic animal life with the filtered aqueous medium.

2. The method of claim 1, wherein the filter medium comprises wool and esbarto fibers.

3. The method of claim 2, wherein the filter medium comprises 85% wool and 15% esbarto fibers, and has a resin content which is about 35% by weight of the finished filter medium.

4. The method of therapeutically treating aquatic animal life by placing said life in aqueous medium habitat which has been passed through a porous melamine-aldehyde resin bonded flocculated cellulose fiber filter medium.

5. A method for therapeutically treating aquatic animal life in an aquarium containing an aqueous habitat comprising the steps of placing a porous melamine-aldehyde resin bonded flocculated cellulose fiber filter medium in the aquarium, continuously passing the aqueous medium in the aquarium through said filter medium; and returning the filtered aqueous medium to the aquarium for contact with the aquatic animal life.

6. The method of claim 5 which consists of the additional step of forcing oxygen into the filtered aqueous medium as it is returned to the aquarium.

References Cited
UNITED STATES PATENTS

| | | | |
|---|---|---|---|
| 2,539,768 | 1/1951 | Anderson | 210—496 |
| 2,676,921 | 4/1954 | Vansteenkiste | 210—169 |
| 2,781,913 | 2/1957 | Thompson | 210—496 X |
| 3,160,588 | 12/1964 | Alarie | 210—463 |
| 3,301,402 | 1/1967 | Falkenberg | 210—169 |

ALDRICH F. MEDBERY, *Primary Examiner.*